March 28, 1933. C. G. JOHNSON 1,902,836
ROLLER TRACK
Original Filed Dec. 1, 1926

INVENTOR
Clarence G. Johnson,
BY
ATTORNEYS

Patented Mar. 28, 1933

1,902,836

UNITED STATES PATENT OFFICE

CLARENCE G. JOHNSON, OF HARTFORD CITY, INDIANA

ROLLER TRACK

Original application filed December 1, 1926, Serial No. 151,884, and in Canada August 20, 1928. Divided and this application filed August 12, 1929. Serial No. 385,293.

This application is a division of my copending application, Serial No. 151,884, filed December 1, 1926, (Patent No. 1,820,459, dated August 25, 1931). The invention in the present instance relates to a channel track for accommodating the rollers of a vertical lift door composed of sections or panels hinged together, as shown for example in my British Patent No. 240,876, of July 1, 1926.

The object of the invention is to provide a track which tends to restrain the roller from shifting laterally of the track and also provides means which prevents the roller from being pulled out of the track in the normal operation of the device. Accordingly, the tread of the track is formed with diverging side flanges which prevent the above mentioned lateral shifting, and opposite the tread is formed a guard which prevents the roller from being drawn out of the track.

The invention is fully disclosed by way of example in the following description and in the accompanying drawing, in which—

Reference to these views will now be made by use of like characters which are employed to designate corresponding parts throughout.

Figure 1:
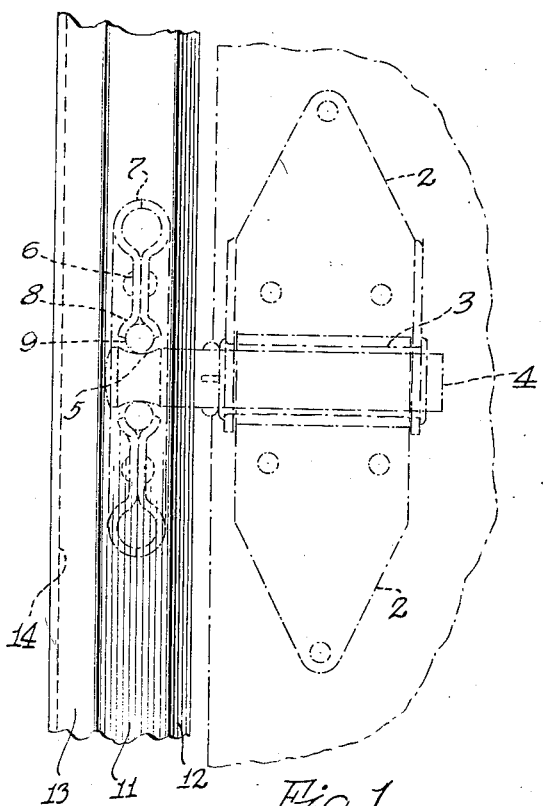
Figure 1 is a fragmentary elevation of the door structure in conjunction with the roller and track.
Figure 2:
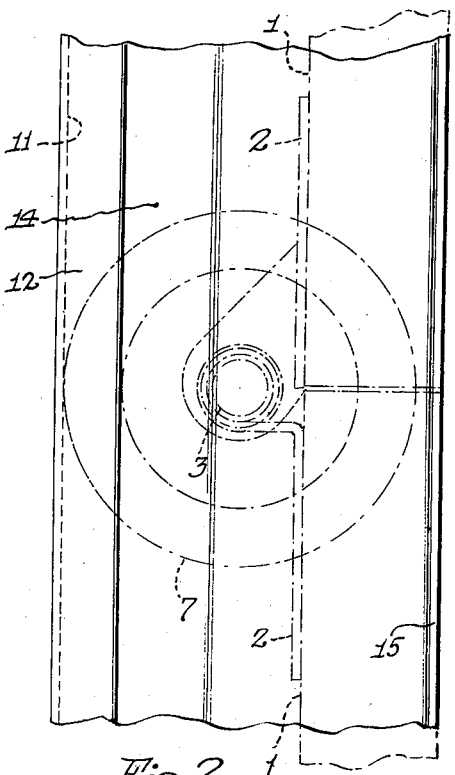
Fig. 2 is a side elevation thereof.

It will first be recognized that the door is made up of panels or sections 1 joined together by hinges which comprise plates 2 secured to the sections. The plates are pivotally connected together by any suitable means such as a sleeve 3 which serves as the bearing for a roller pintle 4. The outer end of the roller pintle is grooved at 5 and carries a roller consisting of a pair of like plates 6 riveted together and shaped to form an outer tread portion 7 and an inner ball race 8 which contains ball bearings 9 riding in the groove 5.

The movement of the door is guided by means of a track at each edge thereof for receiving the rollers which are likewise provided at both edges of the door. The track comprises a flat tread portion 11 formed with inner and outer inclined walls 12 and 13 said walls and tread forming an auxiliary channel to guide the roller along the center part of the track and hold it against any substantial transverse movement. The outer wall 13 is considerably longer than the wall 12 and merges into a side wall member 14 parallel to the general plane of the roller. From the wall 14 is extended a guard member 15 lying behind the roller and parallel to the tread portion 11 so that the parts 11 and 15 lie at diametrically opposite points of the roller, and the treads 11 and 15 and walls 13 and 14 constitute the main channel for holding the door in vertical position. The guard serves as a means for preventing the roller from being lifted over the side wall 12 in the normal operation of the device. The pintle or roller stem is held in position perpendicular to the track section 14 by means of the sleeve 3. While this perpendicular position is maintained, the wall 12 prevents the roller 7 from being withdrawn from the confines of the track. The roller with the pintle may be removed by tilting the entire roller assembly, thus permitting the top of the roller to pass the end of the guard 15, and the bottom of the roller to pass over the wall 12. It will also be seen that the inclined wall 13 prevents the outer end of the pintle from coming into frictional engagement with the side wall 14.

Figure 3:
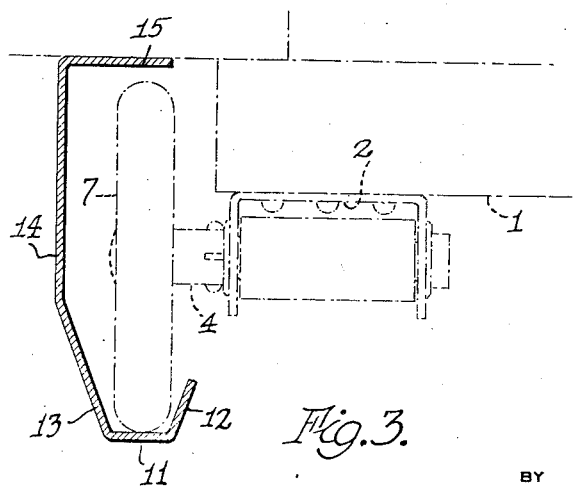
Fig. 3 is a cross section of the track, showing the door and roller structure in elevation.
Figure 4:
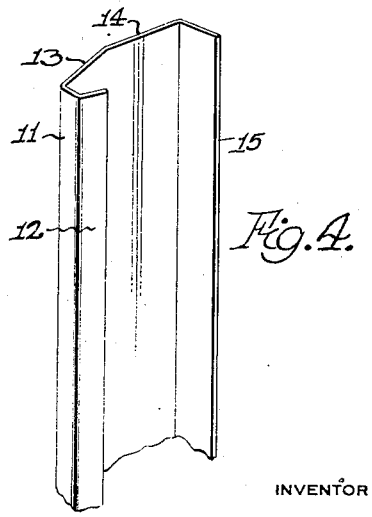
Fig. 4 is a perspective view of a fragment of the track.

As more particularly shown in Fig. 3, the distance between the tread 11 and member 15 is greater than the overall diameter of the roller 7, thus ensuring against binding during the door movements. In addition, the member 15 is of a lateral length in cross-section as to place its inner or free edge as approximately opposite the inner line of the tread face with the inner diverging wall 12 projecting inwardly beyond such lateral wall; the member 15 thus lies opposite the roller path so that any movement of the door to carry the roller away from the tread face 11 would be limited by contact with the member, the roller travelling in contact with the member 15 under such circumstances. Hence, member 15 can be considered as a second tread face, the two tread faces, however, being spaced apart a distance greater than the diameter of the roller so that the latter can contact with but one of the tread faces at any time during the vertical lift movements.

As will be understood, the angle of divergence of walls 12 and 13 from the travel path of the roller is such that any shifting of the roller axially to bring it into contact with either wall, will practically limit the contact to a point or limited zone contact thus offering the least resistance to a turning movement of the roller. And, as will be obvious, the arrangement is such that the track practically forms a barrier for the door edge and the rollers carried thereby during the vertical lift movements, thereby tending to reduce possibility of damage to these during ordinary usage.

Although a specific embodiment of the invention has been illustrated and described, it will be understood that various alterations in the details of construction may be made without departing from the scope of the invention, as indicated by the appended claims.

What I claim is:—

1. A channel track for a vertical lift door on which a plurality of single roller units are mounted on horizontally-disposed shafts at the vertical margins thereof, which channel comprises a pair of parallel and oppositely-spaced treads between which the rollers at the adjacent margin of the door are disposed to hold the door in vertical position, a web uniting the said treads and positioned at the margin thereof remote from the door, a portion of which web is inclined away from the door to thereby space the web from the rollers in said channel, a wall at the margin adjacent the door leading from one of said treads and inclined toward the door and extending part of the distance toward the opposite tread, the inclined portion of the web and the inclined wall constituting portions of an auxiliary channel for the rollers to guide them during lateral shifting of the door in its vertical movement by contacting the rollers only at a point adjacent the periphery of each.

2. A channel track for a vertical lift door on which a plurality of single roller units are mounted on horizontally disposed shafts at the vertical margins thereof, said channel comprising a pair of parallel and oppositely-spaced treads between which the rollers at the adjacent margin of the door are disposed to hold the door in vertical position, a web uniting the said treads and positioned at the margin thereof remote from the door, a portion of which web is inclined away from the door to thereby space the web from the rollers in said channel, a wall at the margin adjacent the door and leading from one of said treads and inclined toward the door and extending part of the distance toward the opposite tread, the inclined portion of the web and the inclined marginal wall constituting portions of an auxiliary channel for the rollers during lateral shifting of the door in its vertical movement, and the other of said treads being free at the margin thereof adjacent the door to constitute thereby an opening between the treads through which the rollers may be inserted in the channel at any point thereof.

3. A channel track for vertical lift doors, wherein the door includes a plurality of rollers positioned to locate the rolling path of the rollers at the side edges of the door and spaced therefrom, and wherein the door seating face is located between the roller axis and the jamb seating face during vertical travel of the door, said track having a cross-sectional configuration comprising a flat tread face having walls diverging laterally of the roller travel path in the direction of the roller axis to form a channel-like formation wherein the tread face substantially equals the overall roller width, the outer diverging wall being of materially greater length than the inner wall on the line of section, a wall leading from the outer diverging wall substantially parallel with the roller travel path and crossing the roller axis, and a lateral wall leading from said parallel wall toward the door and substantially parallel with the tread face and spaced from the latter a distance greater than the roller diameter, whereby an assemblage of door and track will cause the track to form a barrier for the side edges of the door and its rollers when in vertical position, said diverging walls tending to maintain the rollers operative with the tread face.

4. A track as in claim 3 characterized in that the free edge of the lateral wall lies approximately opposite the inner line of the tread face to locate the inner diverging wall as projecting inwardly beyond the lateral wall, whereby the inner diverging wall will prevent roller movement from the track during normal operation and permit such disengaging movement by canting of the roller axis.

5. A track as in claim 3 characterized in that the angles of divergence of the diverging walls is such that shifting of a roller into contact with a diverging wall will limit roller contact with such wall to substantially a point or limited zone contact.

In testimony whereof I affix my signature.

CLARENCE G. JOHNSON.